N. C. NICOL.
SUPPORT.
APPLICATION FILED NOV. 1, 1919.
1,371,514.
Patented Mar. 15, 1921.
2 SHEETS—SHEET 1.
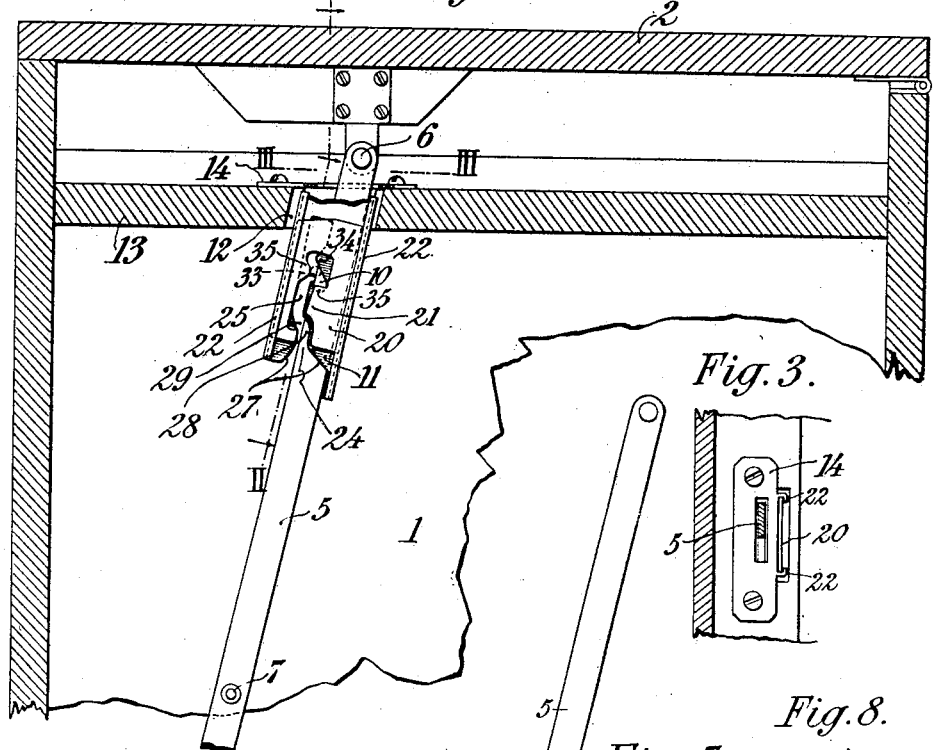
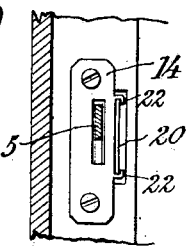
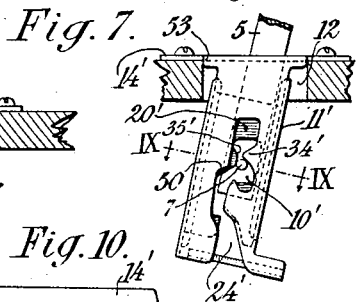
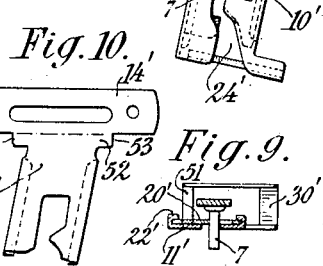
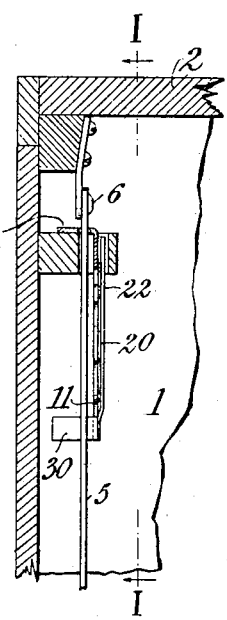
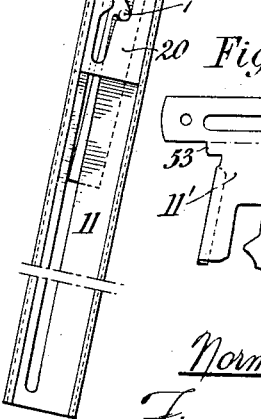
WITNESS:
Rene Bruine
INVENTOR
Norman C. Nicol
By Attorneys.
Fraser Turk & Myers

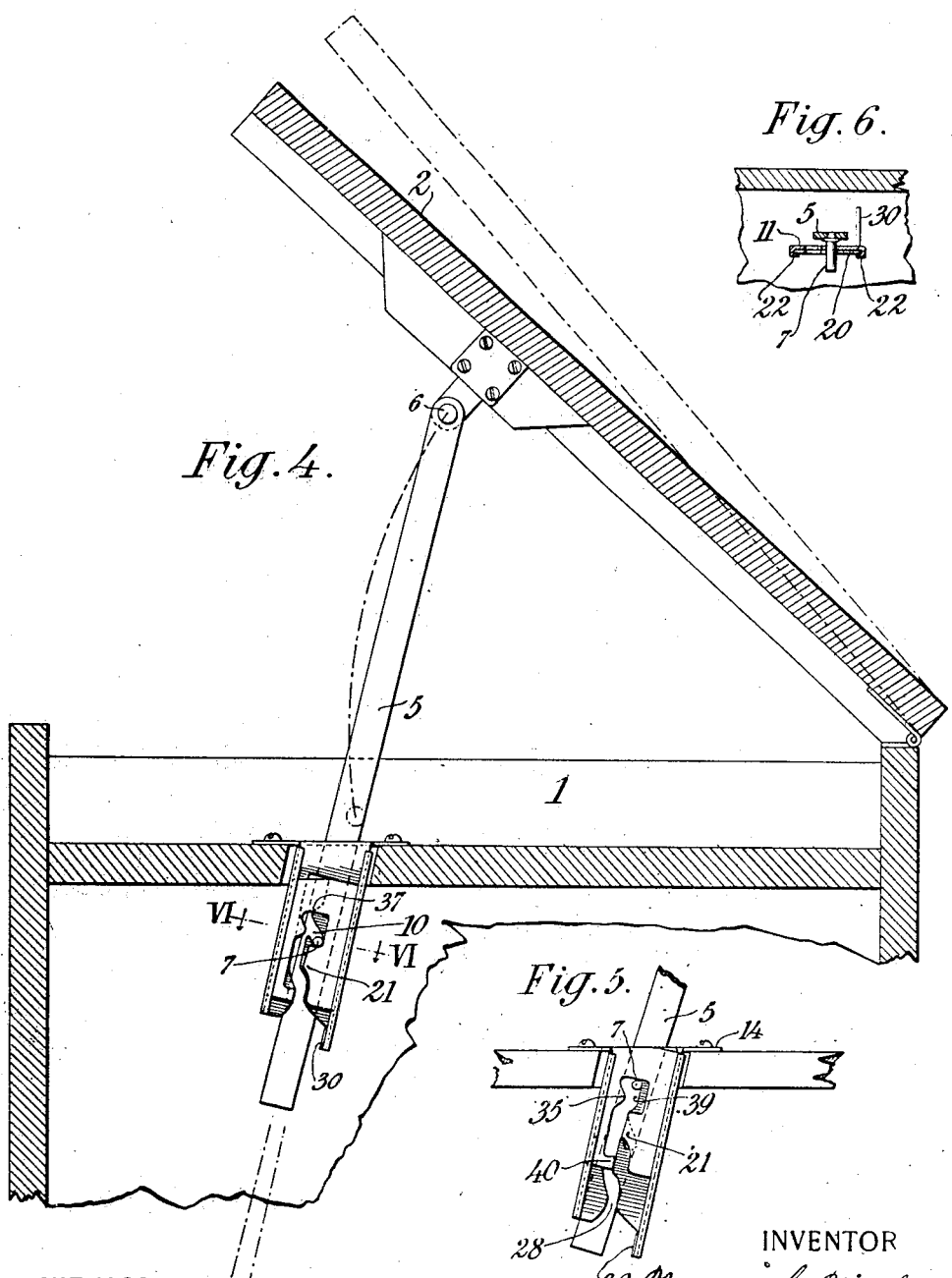

UNITED STATES PATENT OFFICE.

NORMAN C. NICOL, OF NEW YORK, N. Y.

SUPPORT.

1,371,514.   Specification of Letters Patent.   Patented Mar. 15, 1921.

Application filed November 1, 1919. Serial No. 334,920.

*To all whom it may concern:*

Be it known that I, NORMAN C. NICOL, a citizen of the United States of America, residing in the borough of Manhattan, city, county, and State of New York, have invented certain new and useful Improvements in Supports, of which the following is a specification.

This invention relates to supports for parts separable from one another, such as boxes, trunks, phonograph cabinets, casings, etc., provided with lids or covers or the like, and aims to provide improvements therein.

The present invention provides an improved device for supporting separable parts, as, for example, a phonograph cabinet and its lid, in the open position of the lid. The device comprises a prop carrying a locking pin or projection thereon, a recess in which said pin engages to hold the lid in open position, and a guard, movable by said pin to cover and uncover said recess, said guard being moved to cover said recess by raising the lid (thereby causing the pin to strike against a part of the guard and move it), whereby said pin passes said recess when the lid is lowered, said pin, after passing said recess, striking a part of the guard to move the guard to a position to uncover said recess, whereby, when the lid is again raised, said recess is open to receive said pin.

The invention further preferably provides means for disengaging said pin from said guard after the pin has moved the guard to a position uncovering said recess. The invention further provides means for guiding said prop, so as to cause the reëngagement of said pin with said guard, when the lid is again lifted.

The invention further provides means for stopping said pin, when the lid is lifted, in front of said recess, so that the pin will fall into said recess when the lid is slightly lowered or released. The operation of the device takes place without requiring any special care or refinements of manipulation on the part of the user.

The invention further provides improvements in details, and in advantageous combinations and arrangements of parts, hereinafter more fully set forth, and defined in the claims annexed.

An embodiment of the invention is illustrated in the accompanying drawings. In said drawings,—

Figure 1 is a vertical sectional view through a box having a lid provided with the present improvements, the section being on the line I—I, Fig. 2;

Fig. 2 is a sectional view on the line II—II, Fig. 1;

Fig. 3 is a detail sectional view on line III—III, Fig. 1;

Fig. 4 is a view similar to Fig. 1, showing the lid in supported open position;

Fig. 5 is a detail sectional view illustrating the position of the parts where the lid has been lifted, (see the dotted line position, Fig. 4) to move the guard to a position covering the recess for the pin, preliminary to lowering the lid;

Fig. 6 is a detail sectional view on the line VI—VI, Fig. 4;

Fig. 7 is a view illustrating a modification wherein the plate corresponds in length to the length of movement of the pin, and wherein the pin remains in engagement with the plate and guard throughout its movement;

Fig. 8 is a view illustrating another embodiment of the invention;

Fig. 9 is a sectional view on the line IX—IX, Fig. 8;

Fig. 10 is a detail view of the plate shown in Fig. 8.

In said drawings, numeral 1 designates the box, and numeral 2 the lid. The lid is here shown as hinged to the box, though this hinged relation of the lid to the box is not essential as regards the invention.

Numeral 5 designates a rod or prop which is connected to the lid, preferably through a hinged joint, as indicated at 6. The prop 5 has a pin or projection 7 thereon adapted, in the raised position of the lid, to rest within a recess 10 and support the lid in open position. The recess 10 is conveniently formed in a plate 11 attached in any suitable manner to the box 1. For convenient attachment, the plate 11 is relatively narrow, so as to readily pass through a small slot or opening 12 which may be formed in a shelf or platform 13 near the top of the box (as for example, found in phonograph cabinets), and the upper end of the plate 11 is formed with or attached to a plate 14, by means of which the plate 11 may be secured to the box or cabinet by screws or the like, entering the upper face of the shelf or partition 13 for example, thereby rendering it possible to attach the plate to the box without having to enter the compartment beneath the shelf or partition 13. This feature is of especial importance where the device is to be attached to boxes, phonograph cabinets or the like, already made or in use.

Numeral 20 designates the guard having a portion 21 for covering and uncovering the recess 10 in the plate 11. The guard 20 is movable with relation to the plate 11, being preferably slidable lengthwise thereof, means being preferably provided for slidably connecting said plate and guard together. Such means are to be found in the flanges 22—22, upon one of the parts, turned over the edges of the other part, the flanges being here shown as upon the plate 11. In order to provide considerable frictional resistance between the guard 20 and plate 11, one of these parts, as for example the guard 20, is bowed, (see Fig. 3). The plate 11 and guard 20 are provided with slots 24 and 25 respectively, in which the pin 7 slides. Plate 11 may be made of a length corresponding to the length of movement of the pin 7, (Fig. 7). However, as shown in Figs. 1 to 6 inclusive, the plate 11 and guard 20 are shown as being considerably shorter than the length of movement of the pin 7, means being provided, as hereinafter more fully described, for disengaging the pin 7 from the guard, after the pin has moved a relatively short distance beyond the recess 10, in the closing movement of the lid. The edges of the plate adjacent the lower end of the slot 24, are flared as indicated at 27 to facilitate the entrance of the pin 7 into the slot 24. The slot 24 in the plate 11 near the lower end of the plate has a lateral bend, as indicated at 28, and the slot 25 in the guard 20 has a side opening or outlet near its lower end, as indicated at 29.

Means are preferably provided for guiding the prop 5. This means is preferably a lug 30, bent over to one side from the lower end of the plate 11.

*Operation, (including additional description.)*

The lid 2 may be lifted in the usual manner. As the lid opens, the prop 5 is carried along with it, being guided by the lug 30. The pin 7 enters the slots 24 and 25 in the plate 11 and guard 20 respectively, moving in said slots until it comes to a position indicated by the dotted line circle 33 in Fig. 1. Here the pin 7 becomes bound or stopped by the projection 34 on the plate 11 and a projection 35 on the guard 20. The opening of the lid is consequently arrested at this point, and when the lid is released, the pin 7 upon the prop, enters the recess 10, and the lid is hence held open and supported in open position.

Upon entering the recess 10, the pin 7 strikes against a portion 35 of the guard, moving the guard slightly, thereby separating the projections 34 and 35, the parts then having the position shown in Fig. 4.

In order to lower the lid, the lid is lifted slightly (see dotted line position Fig. 4), bringing the pin 7 attached to the prop against a part 37 of the guard, and moving the guard to a position where the part 21 thereof closes the recess 10. The parts will then be in the position shown in Fig. 5. The slot 24 is enlarged at its upper end as indicated at 39, Fig. 5, to enable the pin 7 to pass the projection 35 on the guard. The lid may thereupon be lowered, the part 21 of the guard preventing the pin from dropping into the recess 10 upon the closing movement of the lid.

After the pin 7 has passed the recess 10 upon its closing movement, it strikes against a part 40 of the guard carrying the guard to a position where the part 21 thereof uncovers the recess 10.

The pin 7 may thereupon be disengaged from the guard by the bend 28 in the slot in the plate 11. Thereafter the pin continues moving free of the plate and guard until the lid reaches its fully closed position.

It will be seen that if the lower end of the prop moves through any considerable angle between its open and closed positions, that there will be a "hip" or "throw," imparted to said lower end, especially when the lid is raised rapidly. This would be liable to cause the pin to miss the entrance to the slots 24 and 25 and strike against a part of the plate which would stop the pin suddenly, possibly throwing the lid out of the hand of the user, and also producing an undesirable shock and noise. By guiding the prop 5 by the lug 30 adjacent the entrance to the slots 24 and 25, the foregoing objections are avoided, said lug angularly displacing the lower end of the prop to a minimum extent in moving from open to closed position, and also guiding said prop immediately in front of the opening to said recesses, whereby there is obtained in practice an easy and sure entrance of the pin into said slots. Where the prop is guided at a point nearer to its point of attachment to the lid, as, for example, on the edge of the slot in the plate 14, there is a greater swing or angular movement of the lower end of the prop in the opening and closing movements of the lid, than is the case where the prop is guided by a guide farther from the point of attachment of the prop, as is the guide 30. Moreover, much less care in fitting the parts of the support to a cabinet is required, where the guide is placed similarly to the guide 30. A slight variation from the position of the point of attachment of the prop with relation to the guiding edge on the plate required for proper working (where such guiding edge is located near the point of attachment of the prop) will cause the pin to miss the entrance to the slots in the plate 11 and guard 20, or to badly function in connecting and disconnecting with the plate and guard.

If the lid is being lifted quickly and carelessly, the motion, after the pin has entered the slots, will not be arrested until its movement is blocked or stopped by the projections 34 and 35. If the arresting of the lid is so sudden as to cause the lid to slip in the hand of the user, the lid will not fall to its closed position, but instead the pin will enter the recess 10, and the lid will be held supported in open position.

In Fig. 7 the operation is similar to that of the construction shown in Figs. 1 to 6, only the pin 7 throughout its movement slides in the slot in the plate and instead of the guard being disengaged after the pin passes the recess, the pin carries the guard with it the length of the plate.

In Figs. 8, 9 and 10 is illustrated a slightly different embodiment of the invention. 11' designates a plate corresponding to the plate 11, and having a corresponding recess 10', slot 24', projection 34', and enlargement 39'. The guard 20' is similar to the guard 20. Opposite the projection 34' there is provided a beveled shoulder 50, the purpose of which is to bear the impact of the pin 7 when the lid to which the prop is attached is opened or lifted rapidly, and thereby prevent the pin from knocking the guard forward to such an extent that the projection 35' on the guard will be out of position, with respect to the projection 34', to stop the pin in front of the recess 10' (as heretofore explained in regard to the projections 35 and 34 and the recess 10). The shoulder 50 may be provided in case the friction between the guard and plate is not sufficient, or in the event that it is desired to have positive means for taking the impact or pressure of the pin 7 from the projection 35.

The means for guiding the prop may comprise a lug 30' and a lug or stop 51 opposite the lug 30' adapted to limit the swing of the prop, as shown in Figs. 8 and 9.

The flanges 22' may be turned in toward the side of the fastening plate 14' with the advantage that the plate 11' may be placed flush against the side of the opening 12, so that no space shows between the plate 11' and the side of the opening, thereby providing a more finished piece of work.

In order to strengthen the joint or connection betweeen the plates 11' and 14', the material of the plate 11' may be made of greater width adjacent the bend, as indicated at 52 in Fig. 10. The ends 53 of the part 52 may also serve to center the plate 11' in the recess 12 so that the parts may occupy a correct position in the recess.

The inventive idea herein set forth may receive other embodiments than those herein specifically illustrated and described.

What I claim is—

1. A support for separable parts such as a box and its cover, comprising a prop, and a pin thereon, a part with a recess for receiving said pin to hold the parts in open position, and a guard, said guard being slidable substantially in line with the prop and having parts thereon adapted to be struck by said pin to move said guard to and from a position covering said recess.

2. A support for separable parts such as a box and its cover, comprising a prop, and a pin thereon, a part with a recess for receiving said pin to hold the parts in open position, and a guard, said guard being slidable substantially in line with the prop and having parts thereon adapted to be struck by said pin to move said guard to and from a position covering said recess, a fixed projection above said recess, said guard having a projection coöperating with said fixed projection for stopping said pin adjacent said recess, when the part to which the prop is attached is moved from closed to open position, whereby the pin may drop into said recess when said part to which the prop is attached, is released.

3. A support for separable parts, such as a box and its cover, comprising a prop with a pin thereon, a part with a recess for receiving said pin to hold the parts in open position, and a guard, said guard being movable and having parts thereon adapted to be struck by said pin to move said guard to and from a postion covering said recess, a fixed projection above said recess, said guard having a projection coöperating with said fixed projection for stopping said pin adjacent said recess, when the part to which the prop is attached is moved from closed to open position, whereby the pin may drop into said recess when said part to which the prop is attached, is released, said guard having a part adapted to be struck by said pin as it enters said recess to move said projection on the guard away from said fixed projection to permit said pin to pass between said projections when the part to which said prop is attached is subsequently raised, said pin, after passing said projections being adapted to strike said part of said guard which moves said guard to a position covering said recess, said pin thereupon being able to pass said recess without entering it, when said part to which the prop is attached, is subsequently lowered, said pin after passing said recess being adapted to strike said part of said guard which moves said guard to a position uncovering said recess.

4. A support for separable parts, such as a box and its cover, comprising a prop with a pin thereon, a part with a recess for receiving said pin to hold the parts in open position, and a guard, said guard being movable and having parts thereon adapted to be struck by said pin to move said guard to and from a position covering said recess, a fixed projection above said recess, said guard having a projection coöperating with said fixed projection for stopping said pin adjacent said recess, when the part to which the prop is attached is moved from closed to open position, whereby the pin may drop into said recess when said part to which the prop is attached, is released, said guard having a part adapted to be struck by said pin as it enters said recess to move said projection on the guard away from said fixed projection to permit said pin to pass between said projections when the part to which said prop is attached is subsequently raised, said pin, after passing said projections being adapted to strike said part of said guard which moves said guard to a position covering said recess, said pin thereupon being able to pass said recess without entering it, when said part to which the prop is attached, is subsequently lowered, said pin, after passing said recess being adapted to strike said part of said guard which moves said guard to a position uncovering said recess, and a part adapted to disengage said pin and guard after said guard has been moved to said last named position.

5. A support for separable parts, such as a box and its cover, comprising a prop with a pin thereon, a part with a recess for receiving said pin to hold the parts in open position, and a guard, said guard being movable and having parts thereon adapted to be struck by said pin to move said guard to and from a position covering said recess, a fixed projection above said recess, said guard having a projection coöperating with said fixed projection for stopping said pin adjacent said recess, when the part to which the prop is attached is moved from closed to open position, whereby the pin may drop into said recess when said part to which the prop is attached, is released, said guard having a part adapted to be struck by said pin as it enters said recess to move said projection on the guard away from said fixed projection to permit said pin to pass between said projections when the part to which said prop is attached is subsequently raised, said pin, after passing said projections being adapted to strike said part of said guard which moves said guard to a position covering said recess, said pin thereupon being able to pass said recess without entering it, when said part to which the prop is attached, is subsequently lowered, said pin, after passing said recess being adapted to strike said part of said guard which moves said guard to a position uncovering said recess, a part adapted to disengage said pin and guard after said guard has been moved to said last named position, and means guiding said pin into said engagement with said guard when the part carrying said prop is again lifted.

6. A support for separable parts, such as a box and its cover, comprising a prop with a pin thereon, a part with a recess for receiving said pin to hold the parts in open position, a guard, said guard being slidable, upon engagement with said pins, substantially in line with the prop and having parts thereon adapted to be struck by said pin to move said guard to and from a position covering said recess, and means disengaging said pin and guard after said guard has been moved to a position uncovering said recess, and means guiding said pin into reengagement with said guard.

7. A support for separable parts, such as a box and its cover, comprising a prop with a pin thereon, a plate having a recess for said pin, and a guard, flanges on either said plate or guard adapted to guide and retain the other, one of said parts being bent so as to provide a frictional engagement between said parts.

8. A support for separable parts, such as a box and its cover, comprising a prop with a pin thereon, a plate having a recess for said pin, and a guard slidable on said plate substantially lengthwise thereof, said plate having means thereon for guiding said prop.

9. A support for separable parts, such as a box and its cover, comprising a prop with a pin thereon, a plate having a recess for said pin, and a guard slidable on said plate substantially lengthwise thereof, said pin being disengageable from said guard, and said plate having means for guiding said prop to cause said pin to properly reëngage said guard.

10. A support for separable parts, such as a box and its cover, comprising a prop with a pin thereon, a plate having a recess for said pin, and a guard slidable on said plate substantially lengthwise thereof, said plate having a lug projecting therefrom for guiding said prop.

11. A support for separable parts, such as a box and its cover, comprising a prop with a pin thereon, a plate with a recess for receiving said pin to hold the parts in open position, and a guard, said plate and guard being frictionally connected together, and said guard having a short sliding movement on said plate substantially lengthwise thereof to bring a part thereof into covering and uncovering position with relation to said recess, said guard having a slot therein in which said pin moves, and means for disengaging said pin from said slot and from the guard, after the guard has been moved to position to uncover said recess, and means guiding said pin into said slot to reëngage said pin in said slot and thereby with said guard.

12. A support for separable parts, such as a box and its cover, comprising a prop with a pin thereon, a plate with a recess for receiving said pin to hold the parts in open position, and a guard, said plate and guard being frictionally connected together, and said guard having a short sliding movement on said plate substantially lengthwise thereof to bring a part thereof into covering and uncovering position with relation to said recess, said guard having a slot therein in which said pin moves, and said plate having a slot in which said pin moves, said plate-slot having edge portions which carry said pin out of said guard-slot after said guard has been moved to position to uncover said recess, and thereby disengage said pin from said guard.

13. A support for separable parts such as a box and its cover, comprising a prop, and a pin thereon, a part with a recess for receiving said pin to hold the parts in open position, and a guard, said guard being slidable substantially in line with said prop and having parts thereon adapted to be struck by said pin to move said guard to and from a position covering said recess, and means for stopping said pin in a position to drop into said recess when said pin is lowered.

14. A support for separable parts such as a box and its cover, comprising a prop, and a pin thereon, a part with a recess for receiving said pin to hold the parts in open position, and a guard, said guard being slidable substantially in line with said prop and having parts thereon adapted to be struck by said pin to move said guard to and from a position covering said recess, and means for engaging and disengaging said pin and guard.

15. A support for separable parts such as a box and its cover, comprising a prop, and a pin thereon, a part with a recess for receiving said pin to hold the parts in open position, and a guard, said guard being slidable substantially in line with said prop and having parts thereon adapted to be struck by said pin to move said guard to and from a position covering said recess, a fixed projection above said recess, said guard having a projection coöperating with said fixed projection for stopping said pin adjacent said recess, when the part to which the prop is attached is moved from closed to open position, whereby the pin may drop into said recess when said part to which the prop is attached is released, a fixed shoulder opposite said first-named projection adapted to take the shock off of said projection on the guard when the pin moves rapidly owing to a rapid movement of the part to which it is attached.

16. A support for separable parts such as a box and its cover, comprising a prop with a pin thereon, a plate having a recess for said pin, and a guard slidable lengthwise of said plates, said pin being disengageable from said guard, and means for guiding said prop to cause said pin to properly reengage said guard.

17. A support for separable parts such as a box and its cover, comprising a prop with a pin thereon, a plate having a recess for said pin, and a guard slidable lengthwise of said plate, said pin being disengageable from said guard, and means for guiding said prop to cause said pin to properly reengage said guard, said guiding means being located adjacent the point of reengagement of said guard and pin.

18. A support for separable parts such as a box and its cover, comprising a prop with a pin thereon, a plate having a recess for said pin, and a guard slidable lengthwise of said plate, said pin being disengageable from said guard, and means for guiding said prop to cause said pin to properly reengage said guard, said guiding means comprising guiding parts on either side of said prop.

19. A support for separable parts comprising a plate with a recess for receiving a pin, a guard movable to cover and uncover said recess, and an attaching plate, said first-named plate and said attaching plate being united at an edge of each, and said first-named plate having a plane face at the side opposite said attaching plate, whereby it may be placed flush with the side of an opening in which said first-named plate may be placed.

20. A support for separable parts comprising a plate with a recess for receiving a pin, a guard movable to cover and uncover said recess, and an attaching plate, said first-named plate and said attaching plate being united at an edge of each, and said first-named plate having a plane face at the side opposite said attaching plate, whereby it may be placed flush with the side of an opening in which said first-named plate may be placed, said guard and first-named plate being connected by flanges on said plate overlapping said guard, said flanges being turned inward on the side of said attaching plate.

21. A support for separable parts comprising a plate with a recess for receiving a pin, a guard movable to cover and uncover said recess, and an attaching plate, said first-named plate and said attaching plate being united at an edge of each, and said first-named plate being broadened at its edge which is united to said attaching plate, whereby a stiff and strong joint is formed between said parts.

22. A support for separable parts comprising a plate with a recess for receiving a pin, a guard movable to cover and uncover said recess, and an attaching plate, said first-named plate and said attaching plate being united at an edge of each, and said first-named plate being broadened at its edge which is united to said attaching plate, whereby a stiff and strong joint is formed between said parts, and shoulders being formed at the ends of said broadened portion of the plate acting as means for centering said first-named plate in an opening.

In witness whereof, I have hereunto signed my name.

NORMAN C. NICOL.